United States Patent [19]

Johnston

[11] 3,930,317
[45] Jan. 6, 1976

[54] ELECTRONIC AZIMUTH TRANSFER METHOD AND SYSTEM

[75] Inventor: James V. Johnston, Huntsville, Ala.

[73] Assignee: The United States of America as represented by the Secretary of the Army, Washington, D.C.

[22] Filed: May 10, 1974

[21] Appl. No.: 468,724

[52] U.S. Cl. .................. 33/318; 33/236; 73/504
[51] Int. Cl.² .................................. G01C 19/02
[58] Field of Search .................. 33/318, 236, 275 G; 73/504, 510

[56] References Cited
UNITED STATES PATENTS
3,253,472  5/1966  Klemes .................. 33/318 X
3,731,543  5/1973  Gates .................... 33/318

*Primary Examiner*—William D. Martin, Jr.
*Attorney, Agent, or Firm*—Nathan Edelberg; Robert P. Gibson; Aubrey J. Dunn

[57] ABSTRACT

A system including a highly accurate electronic navigator mounted on a vehicle and the method of using same. Azimuth or position data from the navigator is repeated by a gyro in a remote head on the vehicle slaved by torque and signal cables to the navigator. If the gyro torque cables are opened, the remote head may be removed from the vehicle and mounted on some other body. The azimuth or position data of the body can then easily be determined from the position of the remote head relative to the navigator references. In particular, the invention is envisioned as usable in laying missiles or guns with the navigator and remote head being carried by a jeep or the like.

3 Claims, 2 Drawing Figures

ELECTRONIC AZIMUTH TRANSFER METHOD AND SYSTEM

BACKGROUND OF THE INVENTION

Various equipments and techniques are known for establishing azimuth or other position data for gun or missile batteries. One such technique employs surveying techniques using transits or their equivalents. This technique is slow, requires at least two men to perform, and requires quite a bit of skill on the part of these men. The current most rapid technique employs a highly accurate electronic navigator mounted on a vehicle such as a jeep. The navigator provides an optical output such that some optical reference on the gun or missile can be checked for alignment by using a theodolite or its equivalent. Although more rapid than surveying alone, this method is still slow and requires a skilled operator. One such known system is the PADS (Position & Azimuth Determining System) made by the Guidance and Control Systems Division of Litton Industries. A description of PADS is in Final Report E TL-CR-73-6 of June 1973, by S. R. Ellms. This report is available at the Defense Documentation Center, Cameron Station, Virginia. The instant invention is able to directly determine azimuth or position of the gun or missile relative to the navigator, is very rapid, and requires only one semiskilled operator.

SUMMARY OF THE INVENTION

This invention is a system including an accurate electronic navigator and a remote head therefore, both mounted on a vehicle. The remote head includes a gyro repeater connected by cables to the navigator; the head can be slaved to the navigator while on the vehicle, or can be unslaved, removed from the vehicle (still connected by cables to the navigator) and placed on some other body than the vehicle. The alignment of the other body can then be determined from the position of the remote head relative to the navigator references.

DETAILED DESCRIPTION OF THE INVENTION

Figure 1:
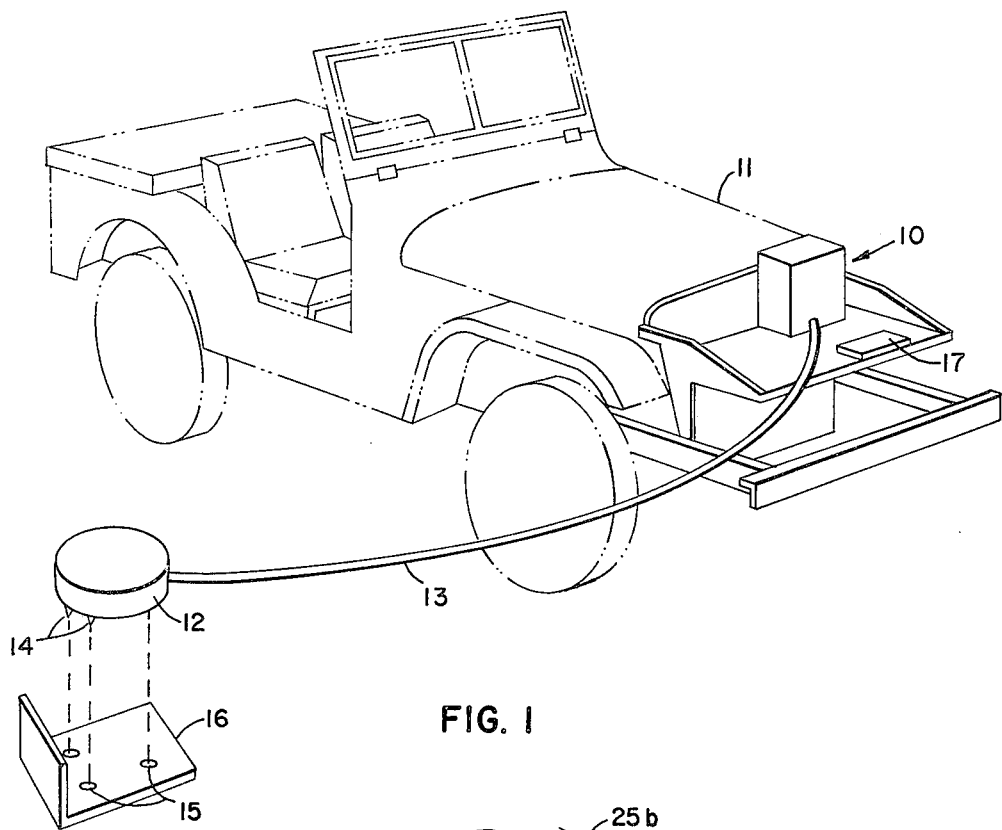
FIG. 1 is a pictorial showing of the system of the invention.

The invention may be best understood by reference to the drawings. In FIG. 1, a PADS system 10 or an equivalent land navigator is mounted on a vehicle 11 such as a jeep. An angular sensor 12 is connected by cable 13 to navigator 10. Sensor 12 is equipped with feet 14 that mate with corresponding holes 15 in a bracket 16 mounted on the equipment (not shown) to be aligned. Bracket 16 is boresighted to the equipment on which it is mounted. Navigator 10 includes a mounting and carrying bracket 17 on which sensor 12 is transported.

Figure 2:
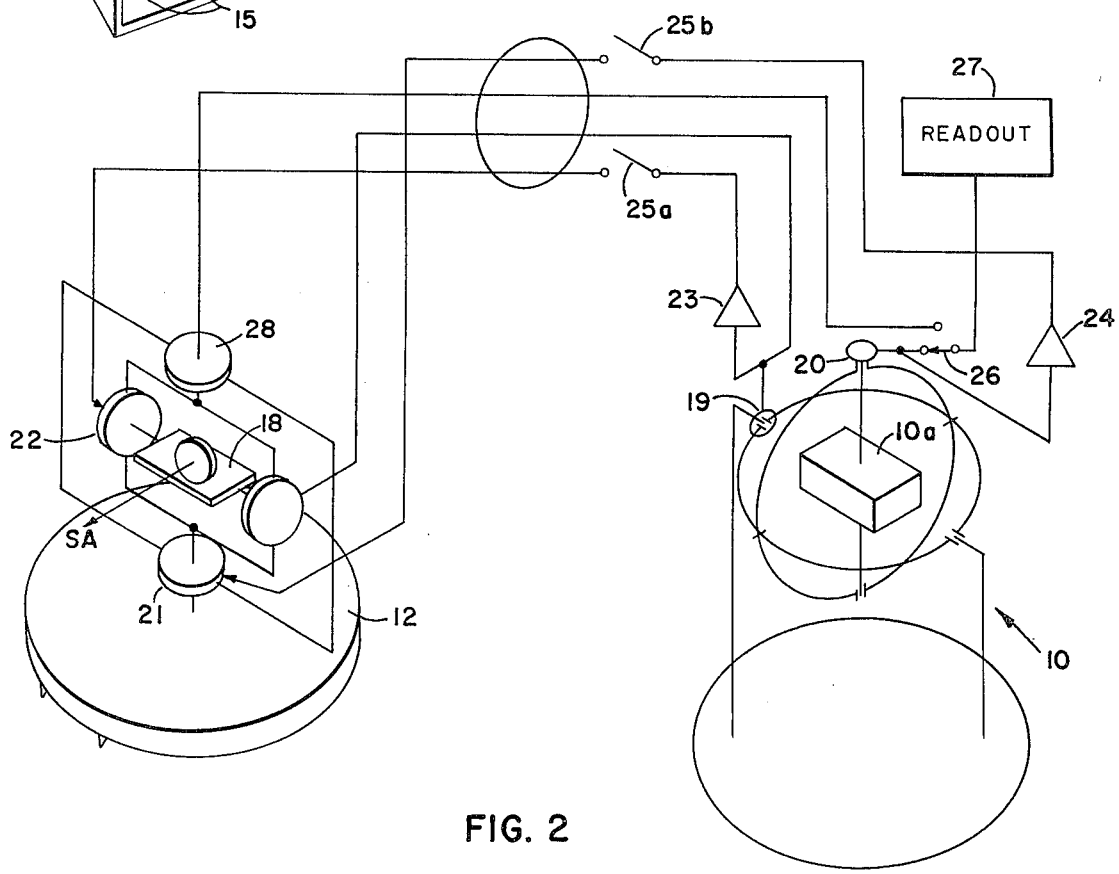
FIG. 2 is a schematic diagram of the system of the invention.

Referring now to FIG. 2, remote sensor 12 includes a directional gyro generally indicated 18. In the initial condition of the system, sensor 12 would be mounted on bracket 17. The inertial platform 10a of navigator 10 will erect itself and gyrocompass to north. Outputs from synchros 19 and 20 are connected to vertical and horizontal synchros 21 and 22 by switches 25a and 25b. The vertical and horizontal reference outputs signals from 19 and 20 thus cause synchros 21 and 22 to align gyro 18 to platform 10a. Switches 25a and 25b act as slave-remote switches for remote sensor 12.

When it is desired to utilize sensor 12 to check the alignment of remote equipment (i.e., equipment not on vehicle 10, slave-remote switches 25a–25b are opened to disconnect the erection signals from platform 10a. This allows directional gyro 18 to maintain its spin axis SA reference to north while its case is being moved to the remote equipment being aligned. When the remote sensor is emplaced on the remote equipment bracket 16, switch 26 is operated from the position as shown on the drawing to its alternate position, to connect readout 27 to sychro 28 of sensor 12. It should be understood that, with switch 26 in the position as shown, readout 27 shows the alignment of platform 10a with respect to north. In its alternate position, switch 26 will allow readout 27 to display the alignment of sensor 12 with respect to north. With sensor 12 mounted in bracket 16, and bracket 16 boresighted to the equipment on which it is mounted, alignment of 12 as displayed by 27 will be the alignment of the equipment.

Even a low-cost directional gyro may be used in 12 and extremely good accuracies may be obtained. For example, a gyro with a drift rate of 1°/hr. would give an error of only 30 inches of arc if 30 seconds were required between unslaving of the remote sensor head and display of its relative position. Naturally, this could be improved by applying a bias to the gyro to remove fixed drifts.

The following advantages are realized by the invention: (1) it may be used when optical alignment techniques are impractical, as during bad weather; (2) it requires only one operator, whereas optical techniques require at least two operators, (3) it is fast, transfer of the remote head can usually be accomplished in 15 seconds or less, (4) it is automatic, i.e., no reading of optical angles, etc. is required, (5) the navigator can provide position information as well as alignment information, (6) no special training is required for the operator, whereas Army surveyors are required to attend a 14 week training course, (7) the remote sensing head is smaller and lighter than optical transits and tripods, logistic transportation requirements are thus reduced, (8) it is cheaper than optical transfer equipment.

I claim:

1. An electronic azimuth transfer device for equipment, including an inertial navigator having means providing horizontal and vertical reference outputs; a remote head including a housing, a directional gyro in said housing, means connecting said reference outputs to said remote head, means in said housing connected to said means connecting and to said directional gyro for aligning said directional gyro in accordance with said reference output; means in said housing for determining and providing remote head outputs indicative of the alignment of said directional gyro with respect to said housing; means for displaying; and means for selectively connecting either said reference outputs or said remote head outputs to said means for displaying.

2. The device as set forth in claim 1 wherein said means connecting includes a switch whereby said means connecting may be opened.

3. The device as set forth in claim 2 wherein said equipment includes a mounting bracket for said remote head.

\* \* \* \* \*